(12) United States Patent
Steeves et al.

(10) Patent No.: US 8,914,901 B2
(45) Date of Patent: Dec. 16, 2014

(54) TRUSTED STORAGE AND DISPLAY

(75) Inventors: David Steeves, Seattle, WA (US); Todd L. Carpenter, Monroe, WA (US); David Abzarian, Kirkland, WA (US); Gregory Hartrell, Sammamish, WA (US); Mark Myers, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1774 days.

(21) Appl. No.: 11/972,620

(22) Filed: Jan. 11, 2008

(65) Prior Publication Data

US 2009/0183249 A1 Jul. 16, 2009

(51) Int. Cl.
*G06F 21/00* (2013.01)
*G06F 21/79* (2013.01)

(52) U.S. Cl.
CPC ........ *G06F 21/79* (2013.01); *G06F 2221/2153* (2013.01)
USPC .......................................................... 726/28

(58) Field of Classification Search
USPC .......................................................... 726/28
See application file for complete search history.

(56) References Cited

U.S. PATENT DOCUMENTS

| | | | |
|---|---|---|---|
| 6,092,202 A | 7/2000 | Veil et al. | |
| 6,687,350 B1 * | 2/2004 | Landry et al. | 379/144.04 |
| 7,228,438 B2 | 6/2007 | Bushmitch et al. | |
| 7,272,723 B1 | 9/2007 | Abbott et al. | |
| 2002/0104891 A1 * | 8/2002 | Otto | 235/494 |
| 2005/0071282 A1 | 3/2005 | Lu et al. | |
| 2006/0165060 A1 * | 7/2006 | Dua | 370/352 |
| 2006/0294023 A1 * | 12/2006 | Lu | 705/67 |
| 2007/0011066 A1 | 1/2007 | Steeves | |

OTHER PUBLICATIONS

"iLok Authorization and iLok.com Information", http://www.digidesign.com/index.cfm?langid=100&navid=54&itemid=22764, 2007.
"Java Card Security: How Smart Cards and Java Mix", http://www.securingjava.com/chapter-eight/chapter-eight-5.html, 1999.
"iLok Authorization and iLok.com Information", http://www.digidesign.com/index.cfm?langid=100&navid=54&itemid=22764 Oct. 29, 2007.
"Java Card Security: How Smart Cards and Java Mix", http://www.securingjava.com/chapter-eight/chapter-eight-5.html Oct. 29, 2007.
"Trusted Output with One Bit of Trusted Input General Trusted Input", http://www.sagecertification.org/publications/library/proceedings/ec96/full_papers/gobioff/html/node19.html, Date: Oct. 4, 1996.
Smith Tony, "SanDisk to Secure Online Sales with USB Flash Drives", http://www.reghardware.co.uk/2006/10/24/sandisk_launches_trusted_signin/, Date: Oct. 24, 2006.

* cited by examiner

*Primary Examiner* — William Goodchild
(74) *Attorney, Agent, or Firm* — Steve Wight; Judy Yee; Micky Minhas

(57) ABSTRACT

A storage token has a display and a keyboard, or other input device, that allows a user to view a request to access a memory location and enter a response to the request. The display allows presentation of details of the request, such as a pathname to a requested memory location, metadata describing a cryptographic key for use in a transaction confirmation, and/or transaction details which are awaiting verification by a credential stored on the token. The storage token may also include a cryptographic engine and a secure memory allowing signing data returned in response to the request.

27 Claims, 3 Drawing Sheets

TRUSTED STORAGE AND DISPLAY

BACKGROUND

Computer security and identity theft are increasing concerns. As e-commerce, e-government, etc. become more prevalent, the opportunities for hackers and identity thieves to invade and steal sensitive information also increase. Inadvertent information disclosure often occurs during data exchange between networked computers, typically from business servers to home computers and vice versa.

This data may include Social Security numbers, account identifiers and associated passwords, private keys, credit card numbers, etc. During the course of a session, a user may not even be aware of the data that a remote site is accessing on a local computer. Perhaps even more dangerous is when hackers access data on an unattended computer, when the user isn't even aware that access is occurring.

Removable security tokens, such as smart cards can reduce the risk of compromise to cryptographic keys because the smart card is infrequently connected to a networked computer and almost always supervised by an owner/stakeholder. However, even if the user is prompted to approve a transaction, they are not aware of the actual data being accessed, which credentials are being used, or the values of such transaction.

Further the risk of malware attacking such a token will increase as the use of such tokens also increases. So not only does an attack from a remote device pose a threat, but also an attack from malware residing on a public computer.

SUMMARY

A storage token that is removably coupled to a computer may include both a separate, trusted user interface and operating system routines that can be substituted for critical routines in the computer to which the storage token is attached.

The trusted user interface of the storage token may communicate with an internal processor on a separate bus, so that data transmitted between the user interface and the processor is shielded from activity on a bus used for communication with the computer.

Operating system routines may be made accessible via custom application program interfaces that allow the computer to execute portions of the operating system from the storage token, thus reducing the risk of a rogue routine compromising the storage token or a transaction in process.

An on-board cryptographic engine and associated secure storage may store a key or keys used to verify requests and code updates, as well as to sign, encrypt, validate, etc., data being supplied in response to a request.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
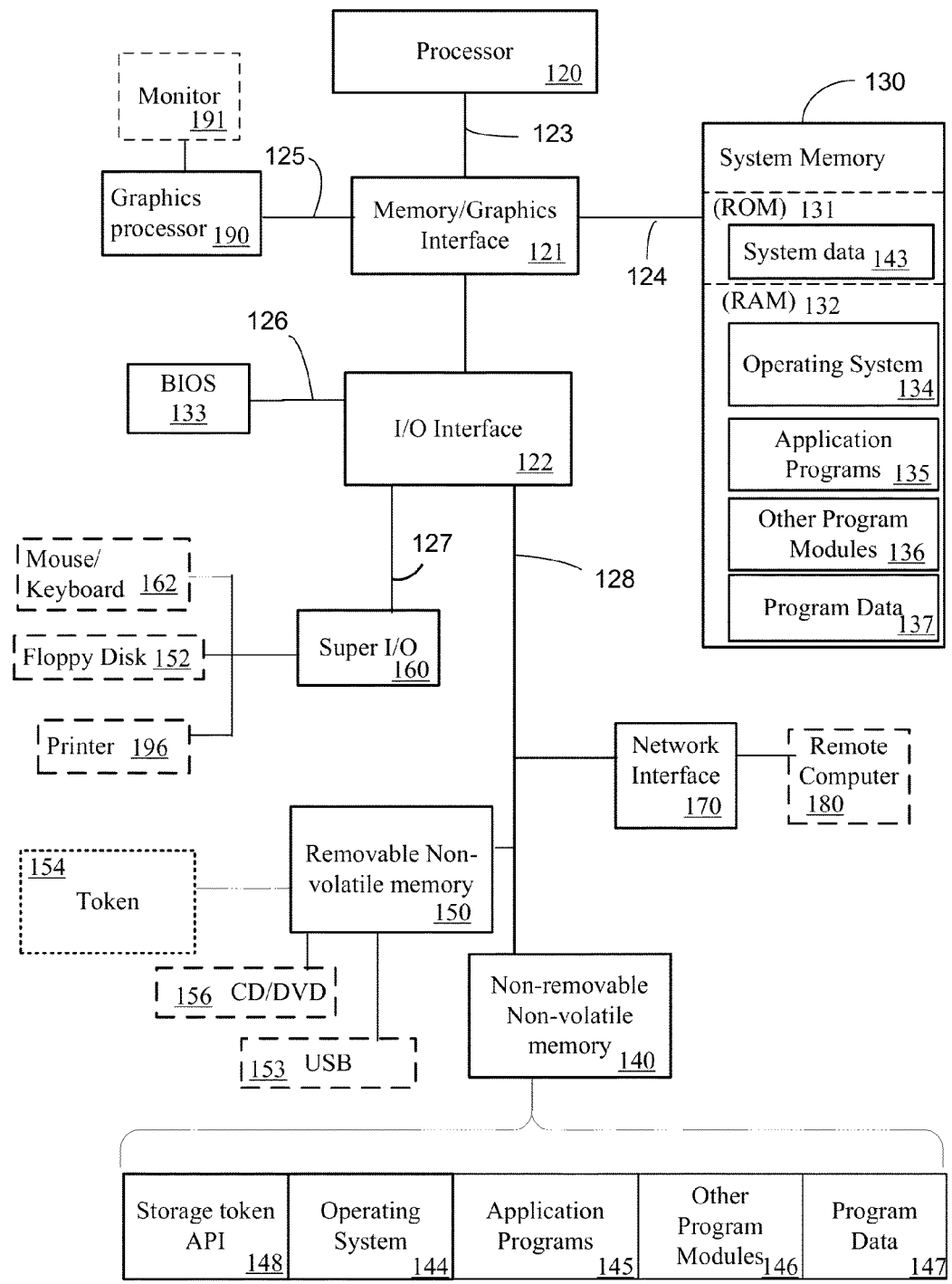
FIG. 1 is a block diagram of a general purpose computing device in communication with a storage token.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 153, firewire (1394), or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

A storage token 154 may be removably attached to the computer 110. The connection may be either wired or wireless. The storage token 154 may be a smart card or other device capable of cryptographic one-way or mutual authentication between itself and one or more processes on the computer 110 or remote computer 180. A token API 148 may be available for application programs 145 or for a remote computer 180 connected via network 170 to access the storage token 154. The storage token may have a user interface (not depicted) for display of information and input of data. The use of the storage token 154 is discussed in more detail below.

Figure 2:
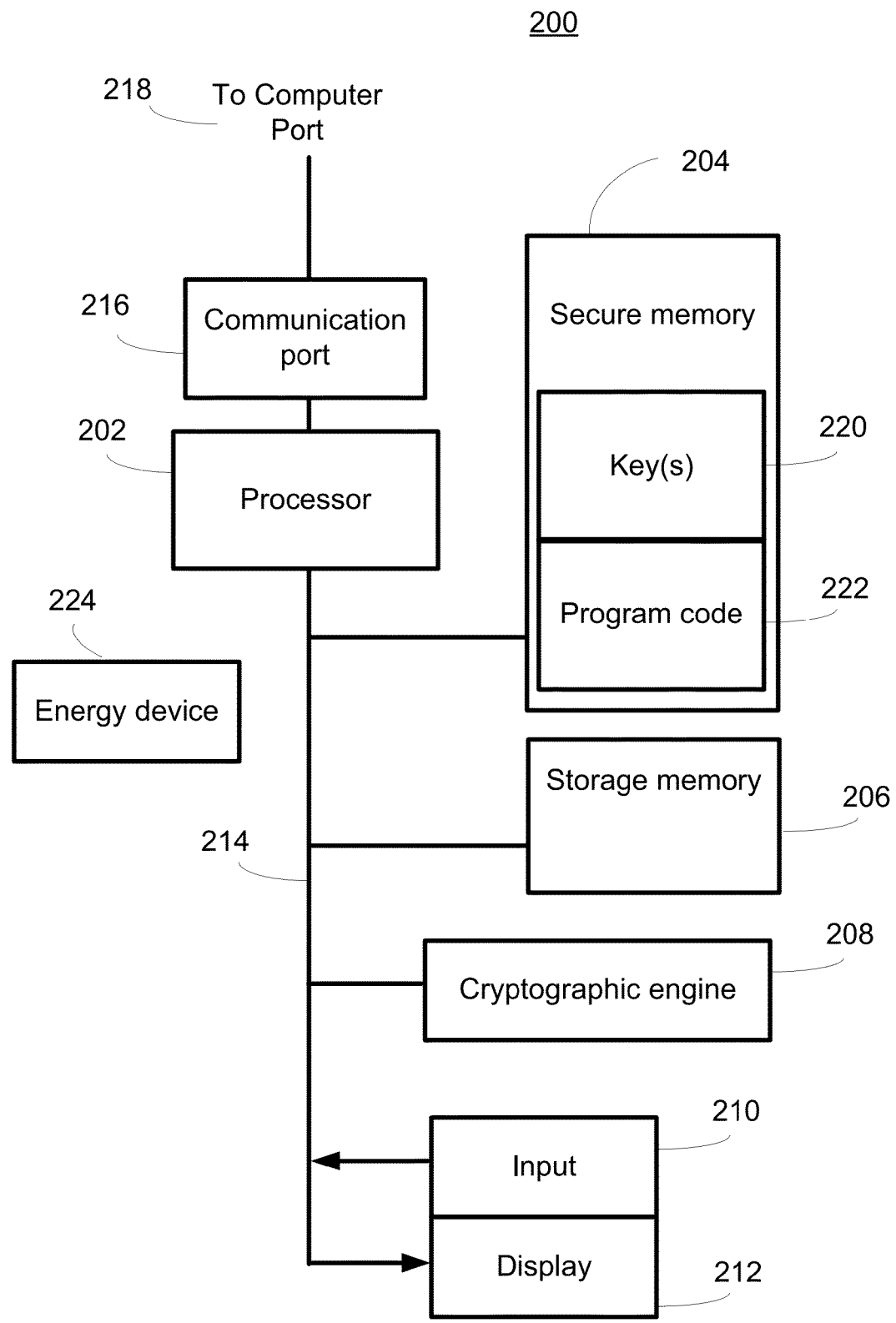
FIG. 2 is a block diagram of an exemplary storage token.

FIG. 2 is block diagram of a representative storage token 200 with a trusted storage and display. The storage token 200 may be similar to the storage token 154 of FIG. 1. The storage token 200 may include a processor 202, a secure memory 204, a general purpose memory 206, a cryptographic engine 208, an input 210, and a display 212. These blocks may be communicatively connected via a bus 214, such as one of the data buses described above. In one embodiment, access to the secure memory 204 is controlled by the cryptographic engine 208. In such an embodiment, the secure memory 204 may only be coupled to the cryptographic engine 208, which is in turn coupled to the bus 214. A communication port 216 may be used to link the storage token 200 to a communication port 218 of a computer 110. The communication port 216 may be wired or wireless.

The secure memory 204 may include cryptographic keys 220, such as private asymmetric keys or shared symmetric keys. Program code 222 in the secure memory 204 may hold executable instructions for use by the processor 202 for implementing cryptographic authentication of access requests, memory updates, etc. The program code 222 may also include operating system functions that may be made available to the computer 110 via the communication port 216. Depending on the architecture and how the processor 202 controls access to the storage memory 206, the storage memory 206 may also be used for storing operating system functions. In one embodiment, an entire operating system may be stored in the storage memory 206 and executed with the storage token 200 acting as bootable media. Because the operating system functions may not be as sensitive as, for example, cryptographic keys, simply restricting access to the storage memory 206 via the processor 202 may provide sufficient protection for operating system or other application functions.

Both the secure memory 204 and the storage memory 206 may be organized in a hierarchical fashion, that is having a folder and file arrangement allowing successive layers of memory locations. Access to keys, data, files, and operating system functions may be located and accessed via the hierarchical file system.

The input 216 may range from a full text entry capability to a simple switch. The display 218 may be a multi-line bit-mapped display, allowing full graphics and text presentation. The display 218 itself may be any of a number of known and developing technologies, such as liquid crystal display, light emitting diode, liquid ink, etc.

An optional energy device 224 may be used to sustain operation of the storage token 200 when it is removed from an external power source. The energy device 224 may be a battery, a so-called super-capacitor, a solar device, etc. The energy device 224 may supply power for very short term operation, for example, for a matter of minutes, such as when the storage token 200 is removed from a reader to view the display 212, enter a response, and be returned the storage token 200 to the reader for further processing. In alternative embodiments, the energy may be supplied by kinetic energy caused by movement of the storage token 200, key activity, a thumbwheel, etc.

In operation, the storage token 200 may be coupled to a computer 110. An application program interface 148 on the computer 110 may support communication with the storage token 200. Alternatively, the storage token 200 may be presented as a special purpose USB memory, a 1394 device, PCI peripheral, or other peripheral using a current or future bus/connection technology. When a kernel function of the operating system 144 on the computer 110 senses the storage token 200, the kernel may request access to the storage token 200. When supported, the operating system may use the storage token 200 to load a signed operating system function over an existing version.

The computer 110 may send a request to the processor 202 for access to an operating system function. The processor 202 may forward the request to the cryptographic engine 208 where a signature of the request may be verified, using a known process. Once the request is verified, the request may then be presented to the display 212, in the form of an instruction for a user to approve or deny the request. The display of the request may include a pathname or graphical depiction of the file location that is the target of the request. The display of the request may also include a confirmation that a signature of the request has been verified.

If the storage token 200 is inserted into a reader, such as a card reader (not depicted), the display may not be visible to the user. If this is the case, the storage token 200 may send a prompt to the computer 110 to display on the monitor 191 a further instruction to the user to remove the card for further processing.

The user may remove the card, read the display, enter a personal identification number, if required, and then indicate the approval or denial of the access request. The energy device 224 may provide power to support the operation of the card while briefly out of the card reader.

When the request is approved, the storage token 200 may provide the requested data or service, such as a digital signature. In some cases, the data provided may be signed by the card so that a consumer of the data can trace the data and signature.

The user may have a high confidence that the request is bona fide and un-tampered because the storage token 200 performs its own cryptographic authentication and the display 212 and input 210 are secure and independent from the computer 110.

Figure 3:
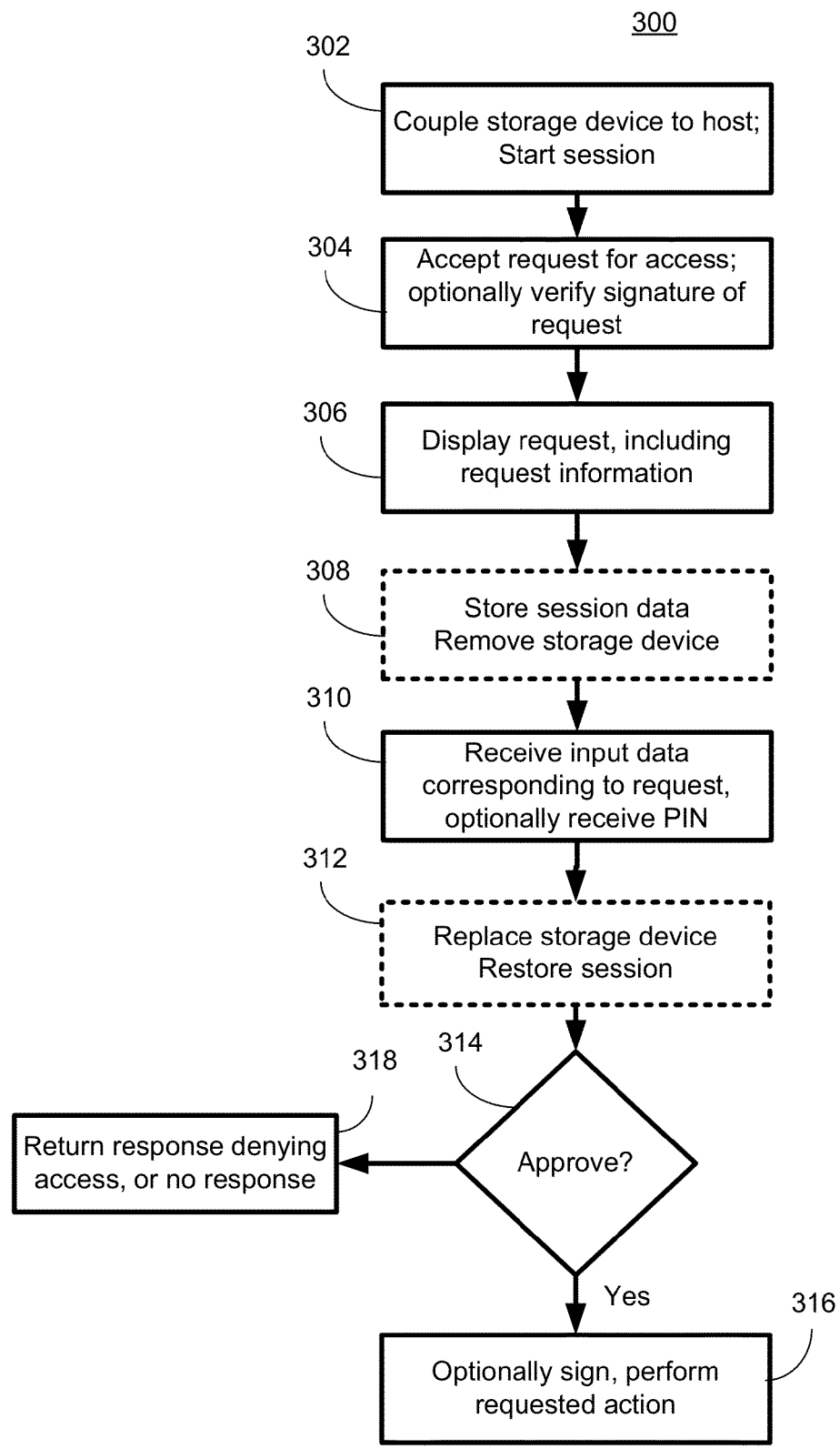
FIG. 3 is a flow chart of a method of operating a storage token.

FIG. 3 is a flow chart of an exemplary method 300 of operating a storage token 200. At block 302, the storage device 200 may be coupled to a host. The host may be a personal computer, a public (e.g. Internet cafe) computer, a smartphone, media player (e.g. MP3 player), gaming system, watch, etc. For the sake of example, the host will be illustrated by computer 110. In one exemplary embodiment, the storage token 200 may rely on the coupling with the computer 110 for both data connectivity and power, and may use a physical attachment, such as an ISO 7816 card reader, USB port, 1394 bus, etc. A physical attachment may support not only data transmission, but also power connections used to power the storage token 200 and to charge the energy device 224. In another embodiment, however, the energy device 224 may be capable of supporting a wireless network connection to the host, e.g. the computer 110, such as a Bluetooth™ wireless network connection, known in the art.

After coupling the storage token 200 to the computer 110, a session may be established. The session may involve mutual authentication, in the case where both the computer 110 and the storage token 200 have a basis for trust, such as public key infrastructure certificates issued by a mutually trusted certificate authority. In other cases, establishing a session may simply involve development of session keys to provide privacy to later data transmission. A Diffie-Hellman key exchange may be used for session key generation.

At block 304, the storage token 200 may accept a request for access from the computer 110. Because the storage token 200 may support several functions, the request may be one of several types. The request may be for access to a memory location in storage memory 206. The request may be for access to a cryptographic key for use in a cryptographic operation, such as encrypting/decrypting a document included in the request, or performing/verifying a digital signature. Another supported request may include providing read access to a block of memory containing a software component, such as an operating system function.

In some embodiments the request may be signed by a host entity making the request. The signature on the request may be checked before the request is presented to the user at block 306.

At block 306, the request for access may be displayed on the user interface of the storage token 200, specifically, on the display 212. The information displayed may include a reference to the type of the request, such as one of the above described requests. Depending on the type, the information displayed may also include a pathname to a file location in the request, or a name of a cryptographic key to be used.

In some transactions, a user may be asked to simply approve access to the storage token 200, but, because that can mean one of several things, the ability to display the type of transaction and the actual location/name of the requested resource, provides the user with finer control over how their storage token, and by association, their identity, is being used. For example, a request for access to a user's private email key may not match with a request to access a bank-supplied banking key.

Optionally, at block 308, the storage token 200 may be decoupled or removed from the host after receiving and displaying the test. Because the storage token display 212 may be obscured by a housing of the card reader or other port, removing the storage token 200 may be the only practical way to view the display 212 and input a response. Alternatively, removing the storage token 200 may simply make the display 212 more easily viewable. The energy device 224 may support operation of the storage token 200 while removed. If the storage token 200 is to be removed, session variables, such as session keys or session identifiers may be stored so the session can be recovered when the storage token 200 is recoupled to the computer 110.

If the connection is wireless, or if the housing on the computer 110 does not obscure the display, this step may not be required. If block 308 is performed, the storage token 200 may prompt the user on monitor 191 via the storage token API 148 to remove the card and respond to the request.

At block 310, the storage token 200 may receive an instruction via the user interface, e.g. the input 210, to confirm or reject the request. In some embodiments, the storage token 200 may request that the user provide a personal identification number (PIN). After verifying the PIN corresponds to an authorized entity, e.g. the correct user, the storage token 200 may then accept the instruction and act accordingly.

Processing may continue at optional block 312. If, at block 308, the storage token 200 was removed from the host physical connection, the storage token 200 may be replaced and re-coupled to the computer 110 at block 312. Any session variables stored at block 308 may be recovered and the session reestablished.

At block 314, the response from the user may be evaluated and an appropriate response generated. If the request is approved by the user, execution may continue at block 316. At block 316, the requested action may be performed, such as retrieving and sending contents of a requested hierarchical memory location, or performing a requested cryptographic operation such as signing content and returning the signed content. In some embodiments, data returned to the host may be signed to allow creation of an audit trail for the transaction. In the case of a signature request, that may mean that a request is signed and then the transaction itself is also signed.

If, at block 314, the response from the user is to deny the transaction, execution may continue at block 318. At block 318, the requested action will not be performed. In one embodiment, a response denying the request may be returned. In another embodiment, for security reasons, no response may be provided and the session continued as if no request had been made.

By providing a user with more information than a simple authorize/deny use of the card, the user is provided with more confidence that only the required identity and information is being used and only for its designated purpose. Because transactions can be signed an audit trail can be created related to storage token use. If executable code is run from the storage token, a user can be confident that critical routines supporting a task or transaction are being performed by known, safe code. Because the storage token can be operated, at least temporarily, away from a host, use of the above process can be accommodated even in an ATM or point of sale device where a storage token such as a smart card might not be accessible to the user to review and approve/deny a request.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A storage token comprising:
    a first bus;
    a port configured to connect the storage token to a computer via the first bus, the port supporting bi-directional data communication with the computer over the first bus;
    a memory configured to store a hierarchical file system of the storage token;
    a display;
    an input;
    a processor executing a token operating system configured to:
        receive, from the computer, a request for access to a hierarchical memory location within the hierarchical file system of the storage token;
        present, on the display:
            the request for access received from the computer on the display of the storage token, the request being displayed with a depiction of the hierarchical memory location within the hierarchical file system of the storage token;
            a confirmation message that the request for access to the hierarchical memory location is verified; and
            an instruction for a user to approve or deny the request for access to the hierarchical memory location within the hierarchical file system of the storage token; and
    a second bus separate from the first bus, the second bus being configured to connect the display, the input, and the processor executing the token operating system.

2. The storage token of claim 1, wherein the hierarchical memory location contains a computer operating system element and the token operating system is configured to send the computer operating system element from the storage token to the computer via the port.

3. The storage token of claim 2, wherein the computer operating system element comprises a signed version of an operating system function that is loaded from the storage token by the computer over another version of the operating system function existing on the computer.

4. The storage token of claim 1, wherein the hierarchical memory location contains a cryptographic key.

5. The storage token of claim 1, wherein the port is a wireless port.

6. The storage token of claim 1, wherein the display is a bitmapped display configured to support graphical images.

7. The storage token of claim 1, further comprising a cryptographic engine that is configured to perform at least one of a hash, an encryption, and a decryption.

8. The storage token of claim 1, further comprising an energy device for operation of the display and the input while the storage token is removed from the computer.

9. The storage token of claim 8, wherein the energy device is one or more of a battery, a capacitor, or a solar energy device.

10. The storage token of claim 1, wherein the depiction displayed on the display comprises a pathname of the hierarchical memory location.

11. A method performed by a storage token having a processor and a user interface integral to the storage token, the method comprising:
    detecting that the storage token is connected to a host at a first time;
    while the storage token is connected to the host at the first time, accepting a request for access to the storage token from the host;
    displaying the request for access to the storage token on the user interface, including displaying a reference to a type of the request;
    detecting that the storage token has been disconnected from the host;
    while the storage token is disconnected from the host, receiving an instruction via the user interface of the storage token, the instruction corresponding to the request;
    detecting that the storage token is connected to the host at a second time after receiving the instruction; and
    providing, to the host, a signed response to the request for access.

12. The method of claim 11, wherein accepting the request for access comprises accepting the request for access to a cryptographic key for digitally signing the request.

13. The method of claim 11, wherein accepting the request for access comprises accepting the request for access to a hierarchical memory location.

14. The method of claim 13, wherein providing the signed response to the host comprises:
    retrieving a content of the hierarchical memory location;
    signing the content to form a signed content; and
    returning the signed content.

15. The method of claim 11, further comprising:
    when the instruction is to deny a transaction with the host, indicating via the signed response that the transaction is denied.

16. The method of claim 11, wherein displaying the request for access including the reference to the type comprises displaying a pathname to a file location within a hierarchical file system of the storage token.

17. The method according to claim 11, further comprising:
    while the storage token is connected to the host at the first time, causing the host to display an instruction for the user to disconnect the storage token from the host.

18. The method of claim 11, wherein the storage token is physically connected to the host at the first time and the second time.

19. The method of claim 11, wherein the storage token is wirelessly connected to the host at the first time and the second time.

20. A storage token comprising:
    a processor;
    computer-readable storage storing executable instructions and a plurality of cryptographic keys;
    a display; and
    a cryptographic unit,
    wherein the executable instructions cause the processor to:
        create a session when the storage token is coupled to a computer;
        receive a request via the session for access to the computer-readable storage, the request identifying an individual cryptographic key stored on the computer-readable storage of the storage token;
        display the request, including an identifier of the individual cryptographic key identified by the request for access to the computer-readable storage of the storage token;
        receive a personal identification number (PIN);
        verify that the PIN corresponds to an authorized entity;
        retrieve data corresponding to the request when the PIN is verified;
        cause the cryptographic unit to sign the data to form signed data; and
        respond to the request with the signed data.

21. The storage token of claim 20, wherein the executable instructions further cause the processor to:
    store session authentication data in an instance when the storage token is coupled to the computer; and
    after the storage token is decoupled from the computer and then recoupled to the computer, reestablish the session using the session authentication data.

22. The storage token of claim 20, wherein the executable instructions further cause the processor to cause the cryptographic unit to sign the data with the individual cryptographic key identified by the request.

23. A storage token comprising:
    a user interface;
    a processor; and
    computer-readable storage storing executable instructions that cause the processor to:
        detect that the storage token is connected to a host at a first time;
        while the storage token is connected to the host at the first time, accept a request for access to the storage token from the host;
        display the request for access to the storage token on the user interface;
        detect that the storage token has been disconnected from the host;
        while the storage token is disconnected from the host, receive an instruction via the user interface of the storage token, the instruction corresponding to the request;

detect that the storage token is connected to the host at a second time after receiving the instruction; and provide, to the host, a signed response to the request for access.

24. The storage token of claim 23, wherein the computer-readable storage comprises a storage memory and a separate secure memory storing cryptographic keys.

25. The storage token of claim 24, wherein the executable instructions cause the processor to use an individual cryptographic key from the secure memory to create the signed response.

26. The storage token of claim 23, further comprising a wired communication port configured to physically connect to the host.

27. The storage token of claim 23, further comprising a wireless communication port configured to wirelessly connect to the host.

* * * * *